US007295612B2

(12) United States Patent
Haskell et al.

(10) Patent No.: US 7,295,612 B2
(45) Date of Patent: Nov. 13, 2007

(54) DETERMINING THE NUMBER OF UNIDIRECTIONAL AND BIDIRECTIONAL MOTION COMPENSATED FRAMES TO BE ENCODED FOR A VIDEO SEQUENCE AND DETECTING SCENE CUTS IN THE VIDEO SEQUENCE

(75) Inventors: Barin Geoffrey Haskell, Mountain View, CA (US); Adriana Dumitras, Sunnyvale, CA (US); Atul Puri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 766 days.

(21) Appl. No.: 10/658,938

(22) Filed: Sep. 9, 2003

(65) Prior Publication Data

US 2005/0053135 A1     Mar. 10, 2005

(51) Int. Cl.
*H04N 7/12* (2006.01)
*G06K 9/36* (2006.01)
(52) U.S. Cl. .................. 375/240.15; 382/236
(58) Field of Classification Search ........... 375/240.15, 375/240.16, 240.13, 240.12, 240.24; 382/236, 382/238
See application file for complete search history.

(56) References Cited

U.S. PATENT DOCUMENTS

| 5,565,920 | A | 10/1996 | Lee |
| 5,592,226 | A | 1/1997 | Dickinson |
| 5,774,593 | A * | 6/1998 | Zick et al. ................ 382/236 |
| 6,307,886 | B1 | 10/2001 | Westermann |
| 6,480,540 | B1 | 11/2002 | Guillotel |
| 6,611,558 | B1 | 8/2003 | Yokoyama |
| 6,618,507 | B1 | 9/2003 | Divakaran |
| 6,778,708 | B1 | 8/2004 | Divakaran |
| 6,944,224 | B2 * | 9/2005 | Zhao et al. ............ 375/240.16 |
| 7,003,038 | B2 * | 2/2006 | Divakaran et al. ..... 375/240.16 |
| 2002/0037051 | A1 | 3/2002 | Takenaka |

(Continued)

FOREIGN PATENT DOCUMENTS

AU          1729495 A       8/1995

(Continued)

OTHER PUBLICATIONS

International Search Report, filed Jan. 7, 2002.

(Continued)

*Primary Examiner*—Gims Philippe
(74) *Attorney, Agent, or Firm*—Adeli Law Group PLC

(57) ABSTRACT

Methods for processing a set of successive video frames in two passes to determine the number of bidirectional (B) and unidirectional (P) motion compensated frames to be encoded in a video coding system. During the first pass, motion vectors and motion costs are computed for each frame and a derived cost value is computed based on the motion cost of at least one frame. The derived cost value is used to determine the number ($N_B$) of B-frames to be encoded in the set of successive frames. In the second pass, the set of successive frames are encoded where $N_B$ frames are encoded as B-frames and some or all motion vectors computed in the first pass are re-used in the second pass. A scene cut detection method is also provided where an impulse-like increase in a ratio of motion costs is monitored.

52 Claims, 10 Drawing Sheets

U.S. PATENT DOCUMENTS

| | | |
|---|---|---|
| 2002/0146071 A1 | 10/2002 | Chang |
| 2002/0150160 A1 | 10/2002 | Liu |
| 2002/0150162 A1 | 10/2002 | Liu |
| 2005/0013365 A1* | 1/2005 | Mukerjee et al. ...... 375/240.16 |

FOREIGN PATENT DOCUMENTS

| | | | |
|---|---|---|---|
| BR | 9904108 | A | 9/2000 |
| CA | 2182005 | A1 | 8/1995 |
| CN | 1248864 | A | 3/2000 |
| CN | 1255021 | A | 5/2000 |
| EP | 0741945 | A1 | 11/1996 |
| EP | 0987903 | A1 | 3/2000 |
| EP | 1005229 | A2 | 5/2000 |
| EP | 1022667 | A2 | 7/2000 |
| FR | 2783388 | A1 | 3/2000 |
| GB | 2263602 | A | 7/1993 |
| ID | 23263 | A | 4/2000 |
| JP | 9509024 | T | 9/1997 |
| JP | 11275585 | A | 10/1999 |
| JP | 2000102021 | A | 4/2000 |
| JP | 2000165889 | A | 6/2000 |
| JP | 2000224590 | A | 8/2000 |
| JP | 2001128179 | A | 5/2001 |
| JP | 2002101416 | A | 4/2002 |
| KR | 2000023133 | A | 4/2000 |
| KR | 2000035571 | A | 6/2000 |
| PL | 335413 | A1 | 3/2000 |
| SG | 74691 | A1 | 8/2000 |
| WO | WO 9520863 | A1 | 8/1995 |
| WO | WO 2004/036920 | A1 | 4/2004 |
| ZA | 9905802 | A | 4/2000 |

OTHER PUBLICATIONS

Liu-H-C et al: "Scene Decomposition of MPEG Compressed Video" Proceedings of the Spie, Spie Bellingham, VA, US, vol. 2419, Feb. 7, 1995, pp. 26-37, XP000671108 ISSN: 0277-786X the whole document.

Written Opinion of the International Searching Authority, filed Jan. 10, 2005.

Ramkishor K., et al., "Adaptation of Video Encoders for Improvement in Quality" *Proceedings of the 2003 IEEE International Symposium on Circuits and Systems*, May 25, 2003, pp. II-693, IEEE, Piscataway, NJ, USA.

Peker K. A., et al., "A Novel Pair-wise Comparison Based Analytical Framework for Automatic Measurement of Intensity of Motion Activity of Video Segments," *2001 IEEE International Conference on Multimedia and Expo*, Aug. 22, 2001, pp. 936-939, IEEE, US.

International Business Machines Corporation, "Dynamic-GOP for a MPEG-2 Video Compression," *Research Disclosure*, Apr. 1, 1999, pp. (whole document), vol. 42, No. 420, Kenneth Mason Publications, Hampshire, GB.

Liu H-C. H., et al., "Scene Decomposition of MPEG Compressed Video," *Proceedings of the SPIE*, Feb. 7, 1995, pp. 26-37, vol. 2419, SPIE, Bellingham, VA, US.

EP Examination Report, Feb. 2, 2007, Apple Computer, Inc.

* cited by examiner

DETERMINING THE NUMBER OF UNIDIRECTIONAL AND BIDIRECTIONAL MOTION COMPENSATED FRAMES TO BE ENCODED FOR A VIDEO SEQUENCE AND DETECTING SCENE CUTS IN THE VIDEO SEQUENCE

FIELD OF THE INVENTION

The invention addresses methods for determining the number of unidirectional and bidirectional frames to be encoded for a video sequence and a method for detecting scene cuts in the video sequence.

BACKGROUND OF THE INVENTION

Video is currently being transitioned from an analog medium to a digital medium. For example, the old analog NTSC television broadcasting standard is slowly being replaced by the digital ATSC television broadcasting standard. Similarly, analog video cassette tapes are increasingly being replaced by digital versatile discs (DVDs). Thus, it is important to identify efficient methods of digitally encoding video information. An ideal digital video encoding system will provide a very high picture quality with the minimum number of bits.

Many video encoding algorithms partition each video frame in a sequence of video frames into sets of pixels called pixelblocks. Each pixelblock is then coded using a predictive encoding method such as motion compensation.

Some coding ISO MPEG or ITU video coding standards, e.g., H.264, use different types of predicted pixelblocks in their encoding. Traditionally, a pixelblock may be one of three types:

1) An intra (I) pixelblock that uses no information from other frames in its encoding, 2) an unidirectionally predicted (P) pixelblock that uses information from one preceding (past) frame, or 3) a bidirectionally predicted (B) pixelblock that uses information from one preceding (past) frame and one future frame.

Generally, a frame that contains any B-pixelblocks is referred to as a B-frame, a frame that contains some P-pixelblocks and no B-pixelblocks is referred to a P-frame, and a frame that contains only I-pixelblocks is referred to an I-frame. The selection of the number of bidirectional motion compensated (B) frames to be coded between intra (I) or unidirectional motion compensated (P) frames is an encoder decision that significantly affects the bit rate of the subsequently compressed video bitstream. A video encoder must decide which is the best way amongst all of the possible methods (or modes) to encode each pixelblock and how many B-frames, if any, are to be coded between each I or P frames. Thus, efficient and effective methods of selecting the number of B-frames to be coded between I-frames or P-frames of a video sequence are needed.

SUMMARY OF THE INVENTION

The present invention provides methods for encoding frames of a video sequence where the sequence is processed in two passes. During the first pass, motion vectors are computed for pixelblocks of each frame in a set of successive frames with reference to other specific frame or frames. In some embodiments, motion compensation errors (MCEs) for pixelblocks of each frame are also computed. A motion cost value for each frame is then determined, the motion cost value being related to the number of bits required to encode the motion vectors and/or the value of the MCEs of the pixelblocks of the frame. A derived cost value is then computed based on the motion cost value of at least one frame (e.g., the derived cost value can be the motion cost value of one frame, the average motion cost value of two or more frames, or the ratio of the motion cost value of a first frame and the motion cost value of a second frame).

In addition, in the first pass, the derived cost value is used to determine the number ($N_B$) of B-frames to be encoded in the set of successive frames. The number ($N_B$) of B-frames to be encoded increases as long as the derived cost value is below a predetermined threshold value. In the second pass, frame $N_B+1$ in the set of successive frames is encoded as a P-frame and frames 1 through $N_B$ are encoded as B-frames where some or all motion vectors computed in the first pass are re-used in the encoding process of the second pass.

In some embodiments, during the first pass, motion vectors are computed for each pixelblock and for each frame in a set of successive frames with reference to an immediately preceding frame. In these embodiments, some of the motion vectors computed in the first pass are re-used in the encoding process of the second pass. In further embodiments, during the first pass, motion vectors are computed for each frame in a set of successive frames with reference to a same preceding frame (frame 0 in the set of successive frames). In these embodiments, all of the motion vectors computed in the first pass are re-used in the encoding process of the second pass.

In some embodiments, the derived cost value is the average motion cost of a series of successive frames. In other embodiments, the derived cost value is the motion cost of a single frame. In further embodiments, the derived cost value is a ratio between the motion cost of a first frame and the motion cost of a second frame that immediately precedes the first frame. In these further embodiments, the ratio of motion costs is used to detect an impulse-like increase in the motion costs between two successive frames which typically indicates a scene cut between the two successive frames. As such, these further embodiments provide a scene cut detection method that is used in conjunction with the two pass encoding method of the present invention. In additional embodiments, the scene cut detection method is used independent from the two pass encoding method.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
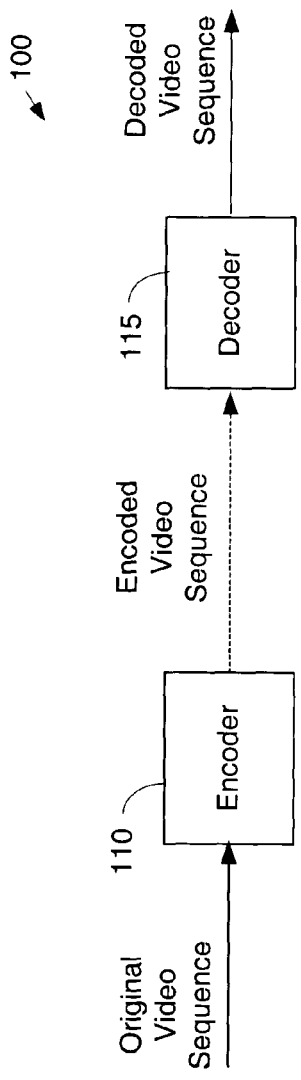
FIG. 1 illustrates an encoding system with encoding and decoding components.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

The present invention provides methods for encoding frames of a video sequence where the frames are processed in two passes. During the first pass, motion vectors are computed for pixelblocks of each frame in a set of successive frames with reference to another specific frame or frames. In some embodiments, motion compensation errors (MCEs) for pixelblocks of each frame are also computed. A motion cost value for each frame is then determined, the motion cost value being related to the number of bits required to encode the motion vectors and/or the value of the MCEs of the pixelblocks of the frame. A derived cost value is then computed based on the motion cost value of at least one frame (e.g., the derived cost value can be the motion cost value of one frame, the average motion cost value of two or more frames, or the ratio of the motion cost value of a first frame and the motion cost value of a second frame).

In addition, in the first pass, the derived cost value is used to determine the number ($N_B$) of B-frames to be encoded in the set of successive frames. The number ($N_B$) of B-frames to be encoded increases as long as the derived cost value is below a predetermined threshold value. In the second pass, frame $N_B$+1 in the set of successive frames is encoded as a P-frame and frames 1 through $N_B$ are encoded as B-frames where some or all motion vectors computed in the first pass are re-used in the encoding process of the second pass.

In some embodiments, during the first pass, motion vectors are computed for each frame in a set of successive frames with reference to an immediately preceding frame. In these embodiments, some of the motion vectors computed in the first pass are re-used in the encoding process of the second pass. In further embodiments, during the first pass, motion vectors are computed for each frame in a set of successive frames with reference to a same preceding frame (frame 0 in the set of successive frames). In these embodiments, all of the motion vectors computed in the first pass are re-used in the encoding process of the second pass.

In some embodiments, the derived cost value is the average motion cost of a series of successive frames. In other embodiments, the derived cost value is the motion cost of a single frame. In further embodiments, the derived cost value is a ratio between the motion cost of a first frame and the motion cost of a frame that immediately precedes the first frame. In these further embodiments, the ratio of motion costs is used to detect an impulse-like increase in the motion costs between two successive frames which typically indicates a scene cut between the two successive frames. As such, these further embodiments provide a scene cut detection method that is used in conjunction with the two pass encoding method of the present invention. In other embodiments, the scene cut detection method may be used independent from the two pass encoding method.

Some embodiments described below relate to video frames in YUV format. One of ordinary skill in the art, however, will realize that these embodiments may also relate to a variety of formats other than YUV. In addition, other video frame formats (such as RGB) can easily be transformed into the YUV format. Furthermore, embodiments of the present invention may relate to various video encoding applications (e.g., DVD, digital storage media, television broadcasting, internet streaming, communication, teleconferencing, etc.) in real-time or post-time. Embodiments of the present invention may also be used with video sequences having different encoding standards such as H.263 and H.264 (also known as MPEG-4/Part 10).

As used herein, a pixelblock is a set of pixels in a frame and is also referred to in the art as a block, macroblock, or sub-block. Also, as used herein, a first pixelblock in a first frame is said to "reference" a second pixelblock in a second frame when information from the second pixelblock is used to compute a motion vector for the first pixelblock. Thus, a first frame is said to "reference" a second frame when a pixelblock in the first frame "references" a pixelblock in the second frame. In addition, computing motion vectors or motion compensation errors (MCEs) for a frame, as used herein, denotes computing motion vectors or MCEs, respectively, for pixelblocks of the frame. In addition, as used herein, a set of successive frames is a subset of frames in a video sequence, the frames being in consecutive order.

The various embodiments described below provide a method for encoding a video sequence in two passes. The first pass computes motion vectors for a set of successive frames of the video sequence and determines the number of B-frames to be encoded in the set of successive frames. The second pass encodes the determined number of B-frames by using some or all of the motion vectors determined in the first pass (i.e., by partially or fully re-using the motion vectors determined in the first pass). Embodiments relating to partial re-use of the motion vectors determined in the first pass are described in Section I. Embodiments relating to full re-use of the motion vectors determined in the first pass are described in Section II. Embodiments for a scene cut detection method that may be used in conjunction with the partial or full re-use method or used independently is provided in Sections I and II.

FIG. 1 illustrates an encoding system 100 with encoding and decoding components 110 and 115. In some systems, the encoding system 100 includes a pre-processing component that precedes the encoding component 110 and a post-processing component that follows the decoding component 115. As shown in FIG. 1, an original video sequence is received by the encoding component 110, the original video sequence being comprised of multiple video frames. Each frame of the video sequence is comprised of a plurality of pixels at pixel locations where each pixel location contains one or more pixel values (for example, luminance (Y) and/or chrominance (U, V) values). Each frame is divided into sets of pixels called pixelblocks.

The encoding component 110 encodes each frame (e.g., as I, P, or B-frames) of the video sequence to produce an encoded (compressed) video sequence. The number of B-frames to be coded between each I or P frames is determined by the encoding component 110 and is a decision that significantly affects the bit rate of the subsequently compressed video bitstream. The encoding component 110 implements methods of the present invention to determine the number of B-frames, if any, to be coded between each I or P frames.

The encoded video sequence is then transmitted and received by the decoding component 115 which processes the encoded video sequence to produce a decoded video sequence for display. Since B-frames of the encoded video sequence use information from future frames, the transmission order of the frames of the encoded video sequence (as transmitted to the decoding component 115) is typically different than the display order of the frames of the decoded video sequence (as produced by the decoding component 115). Thus, the transmission order of the frames of the encoded video sequence is configured such that when it comes time for the decoding component 115 to decode a B-frame, the decoding component 115 will have already received and stored the information of the I-frames or P-frames necessary to decode the B-frame.

Figure 2:
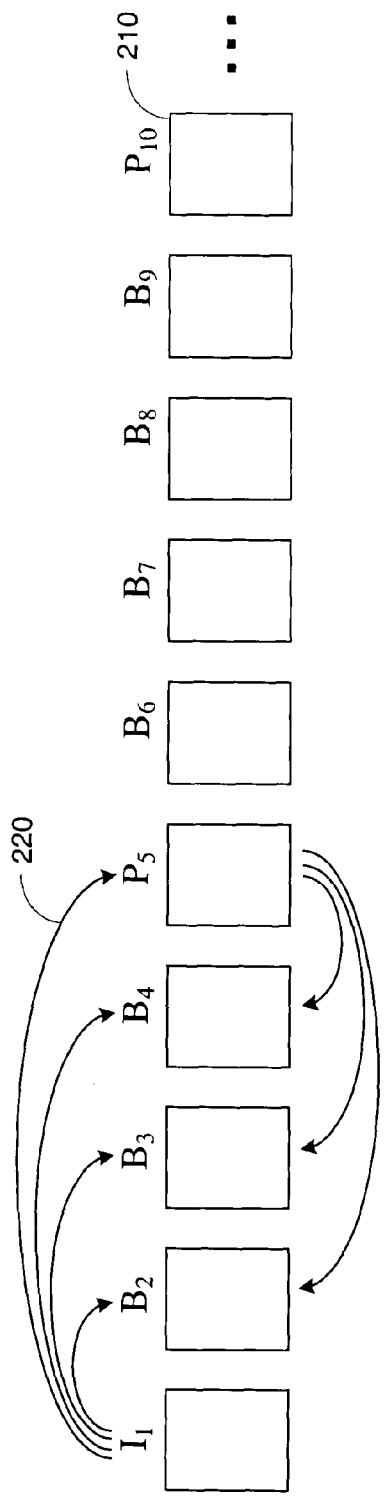
FIG. 2 is a graphical illustration of frames of a video sequence shown in display order.

FIG. 2 is a graphical illustration of frames 210 of a video sequence 200 shown in display order. As shown in FIG. 2, each frame 210 is identified by a frame type (I, P, or B) and a subscripted number (1, 2, 3 . . . ) indicating the display order of the frame in the video sequence 200. In the example shown in FIG. 2, the set of successive frames from $I_1$ through $P_5$ contains three B-frames ($B_2$, $B_3$, and $B_4$) encoded between the I-frames and P-frames. Also, the set of successive frames from $P_1$ through $P_{10}$ contains four B-frames ($B_6$, $B_7$, $B_8$, and $B_9$) encoded between the P-frames.

Arrows 220 indicate motion vector computations using information from a frame (at the start of the arrow 220) to compute motion vectors for another frame (at the end of the arrow 220). For example, as shown in FIG. 2, the information from frame $I_1$ is used to compute the motion vectors for frames $B_2$, $B_3$, $B_4$, and $P_5$. As such, frames $B_2$, $B_3$, $B_4$, and $P_5$ are said to reference frame $I_1$. Also, the information from frame $P_5$ is used to compute the motion vectors for frames $B_2$, $B_3$, and $B_4$. As such, frames $B_2$, $B_3$, and $B_4$ are said to reference frame $P_5$.

Figure 3:
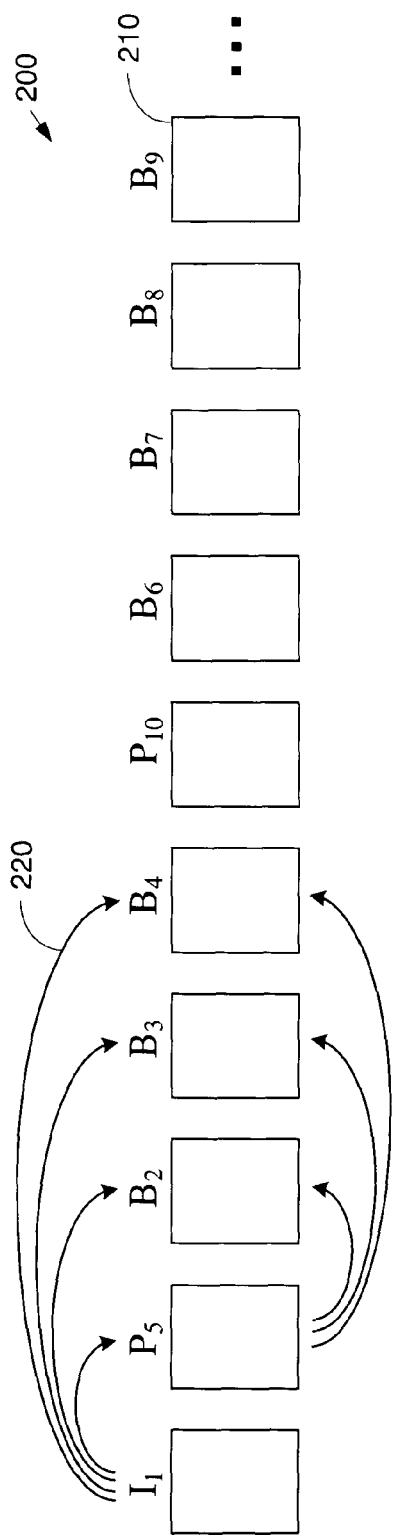
FIG. 3 graphically illustrates the frames of the video sequence of FIG. 2 in transmission order.

After decoding by a decoding component, the video sequence 200 is displayed in the display order shown in FIG. 2. Since B-frames use information from future frames, however, the transmission order of the frames of the video sequence 200 will be different than the display order shown in FIG. 2. FIG. 3 graphically illustrates the frames of the video sequence 200 of FIG. 2 in transmission order. The video sequence 200 in transmission order is received by the decoding component 115 for decoding.

As shown in FIG. 3, when it comes time to decode frame $B_2$, for example, the decoding component 115 will have already received and stored the information of frames $I_1$ and $P_5$ necessary to decode frame $B_2$. Similarly the decoding component 115 will have already received and stored the information of frames $I_1$ and $P_5$ necessary to decode frames $B_3$ and $B_4$. In this operation, I-frames and P-frames are often referred to as stored frames since they are stored for use in the prediction encoding of other frames. However, in some scenarios the B-frames may also be stored and used for predicting subsequent frames. Also, if multiple stored frames are available, then two past or two future frames may be used to predictively encode each B-frame. The frames are then re-ordered from transmission order to a display order (as shown in FIG. 2) for proper display.

The encoding of the P-frames typically utilizes motion compensation prediction where a motion vector is computed for each pixelblock in the frame by referencing pixelblocks of a preceding (past) frame. A prediction pixelblock is then produced by using the motion vector and translating the pixels in the past frame referenced by the P-frame. The difference between the actual pixelblock in the P-frame and the produced prediction block (referred to as prediction error or motion compensation error) is then coded for transmission. In addition, each motion vector may be transmitted via predictive encoding. That is, a prediction is formed using nearby motion vectors that have already been sent, and then the difference between the actual motion vector and the prediction is coded for transmission.

The motion compensation error (MCE) of a pixelblock measures the difference between a first pixelblock in first frame and a displaced, motion compensated second pixelblock in a second frame that is referenced by the first pixelblock, the amount of the displacement being specified by the motion vector for the first pixelblock. The MCE may be the sum of the squared differences between pixels values (for example, the difference in luminance (Y) values) in the first pixelblock and the corresponding pixel values in the displaced second pixelblock. Or the MCE may be the sum of the absolute differences between pixel values in the first pixelblock and the corresponding pixel values in the displaced second pixelblock. In some embodiments, a block transform such as the Hadamard transform is applied to the MCE prior to summation. The MCE of a pixelblock is related to the motion cost in bits required to code the pixelblock (since the greater the MCE, the more bits required to code the MCE and hence to code the pixelblock).

Each B-pixelblock typically uses two motion vectors, one computed from information from a past frame and one computed from information from a future frame. From these motion vectors, two prediction pixelblocks are produced, which are then typically averaged together to form a final prediction pixelblock. The averaging, for example, may use equal 50/50 weighting or it may use unequal weighting. The difference (i.e., the prediction or motion compensation error) between the actual pixelblock in the B-frame and the final prediction block is then coded for transmission.

As with P-pixelblocks, each motion vector of a B-pixelblock may also be transmitted via predictive encoding. That is, a prediction is formed using nearby motion vectors that have already been transmitted and then the difference between the actual motion vector and the prediction is coded for transmission. With B-pixelblocks, however, the opportunity exists for interpolating the motion vectors from those in the nearby pixelblocks of the stored frames. The interpolated value may then be used as a prediction and the difference between the actual motion vector and the prediction coded for transmission. Such interpolation is carried out both at the coder and decoder.

In some cases, the interpolated motion vector is good enough to be used without any correction, in which case no motion vector data need be sent. This is referred to as Direct Mode in H.263 and H.264. This works particularly well when the camera is slowly panning across a stationary background. In fact, the interpolation may be good enough to be used as is, which means that no differential information need be transmitted for these B-pixelblock motion vectors.

Within each frame, the pixelblocks may also be coded in many ways. For example, a pixelblock may be divided into smaller sub-blocks, with motion vectors computed and transmitted for each sub-block. The shape of the sub-blocks may vary and not be square. Within a P-frame or B-frame, some pixelblocks may be better coded without using motion compensation, i.e., they would be coded as intra (I) pixelblocks. Within a B-frame, some pixelblocks may be better coded using unidirectional motion compensation, i.e., they would be coded as forward predicted or backward predicted depending on whether a previous frame or a future frame is used in the prediction.

Prior to transmission, the motion compensation error of a pixelblock is typically transformed by an orthogonal transform such as the discrete cosine transform or an approximation thereto. The result of the transform operation is a set of transform coefficients equal in number to the number of pixels in the pixelblock being transformed. At the decoding component, the received transform coefficients are inverse transformed to recover the motion compensation error values to be used further in the decoding. Not all the transform coefficients, however, need be transmitted to the decoding component for acceptable video quality. Depending on the transmission bit-rate available, a number of transform coefficients may be deleted and not transmitted. At the decoder their values are replaced by zeros prior to inverse transform.

Also, prior to transmission, the transform coefficients are typically quantized and entropy coded. Quantization involves representation of the transform coefficient values by a finite set of possible values, which reduces the accuracy of transmission and often forces small values to zero, further reducing the number of coefficients that are sent. In quantization, typically, each transform coefficient is divided by a quantizer step size Q and rounded to the nearest integer. The integers are then entropy coded using variable word-length codes such as Huffman codes or Arithmetic codes.

Finally, the pixelblock size and shape used for motion compensation may not be the same as the pixelblock size and shape used for the transform. For example, 16×16, 16×8, 8×16 pixels or smaller sizes are commonly used for motion compensation whereas 8×8 or 4×4 pixels are commonly used for transforms. Indeed the motion compensation and transform pixelblock sizes and shapes may vary from pixelblock to pixelblock.

An encoding component must select the best encoding method amongst all possible encoding methods (or modes) that will be used to encode each pixelblock. The combination of transform coefficient deletion, quantization of the transform coefficients that are transmitted and mode selection leads to a reduction of the bit rate R used for transmission. It also leads to a distortion D in the decoded video. The encoding component must also determine how many B-frames, if any, are to be coded between each I or P frames. A brute force approach would simply encode every combination of B-frames and pick the combination that minimized the bit rate. However, this method is usually far too complex. It also requires a very large number of trial and error operations and statistics collections, most of which must be discarded once a final decision is made.

Section I: Partial Re-use of Motion Vectors Determined in a First Pass

In some embodiments, a method for encoding frames of a video sequence comprises processing the frames in two passes where some motion vectors determined in the first pass are re-used in the second pass. During the first pass, motion vectors are computed for pixelblocks of the frames as if the final coding were to be carried out using all P-frames, each frame using information from the preceding frame. In an alternative embodiment, a motion compensation error (MCE) is also calculated for each pixelblock during the first pass. The system calculates a motion cost for each pixelblock of a frame. In many embodiments, the pixelblock motion cost is defined as the total number of bits required to encode the motion vector and/or the MCE value computed for the pixelblock. In some embodiments, the pixelblock motion cost is given by the following equation:

$$\text{pixelblock motion cost} = (\lambda \times \text{motion\_vector\_bits}) + MCE$$

where $\lambda$ is a Lagrangian multiplier. For $\lambda=0$, the pixelblock motion cost equals the value of the motion compensation error (MCE). If the Lagrangian multiplier $\lambda$ is large then the pixelblock motion cost is proportional to the number of bits required to encode the motion vector.

A motion cost for a frame i ($FMC_i$) is the sum of the motion costs of the pixelblocks of frame i. For m successive frames of a video sequence, an average frame motion cost ($AFMC_m$) is computed by adding the individual frame motion costs of the m successive frames and dividing the result by m as expressed by the following equation:

$$AFMC_m = \text{sum } i=1 \text{ through } m \ [FMC_i]/m$$

For a series of m video frames numbered 1 through m.

In some embodiments, the AFMC value for a set of successive frames is used to determine a number ($N_B$) of B-frames to encode between each I or P frames in the set of successive frames (as described below in relation to FIG. 5). In other embodiments, the FMC value for an individual frame is used to determine the number ($N_B$) of B-frames. In further embodiments, a ratio ($FMC_m/FMC_{m-1}$) between the motion cost of a first frame and the motion cost of a second frame that precedes the first frame is used to determine the number ($N_B$) of B-frames.

In the second pass, a number ($N_B$) of frames are encoded as B-frames and the frame $N_B+1$ is encoded as a P-frame, where ($N_B$) has been determined above in the first pass. During the second pass, some of the motion vectors calculated during the first pass are re-used to encode the B-frames and/or P-frames (i.e., the second pass employs partial re-use of motion vectors computed in the first pass).

Figure 4:
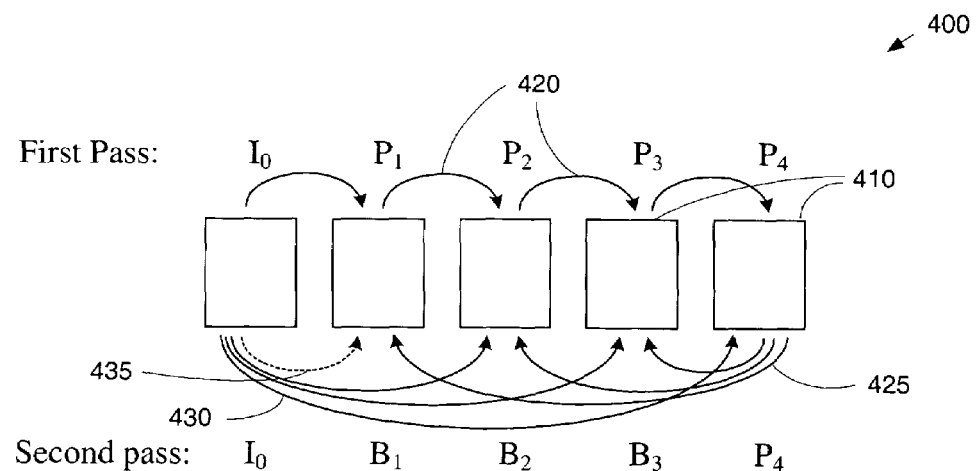
FIG. 4 is a graphical illustration of a set of successive frames that are processed in two passes with partial re-use of motion vectors computed in the first pass.

FIG. 4 is a graphical illustration of a set of successive frames 400 that are processed in two passes with partial re-use of motion vectors computed in the first pass. The set of successive frames 400 is comprised of five frames 410 that are shown in display order. As shown in FIG. 4, for the first and second passes, each frame 410 is identified by a frame type (I, P, or B) and a subscripted number (1 through 4) indicating the display order of the frame in the set of successive frames 400.

Arrows 420 indicate motion vector computations using information from a frame (at the start of the arrow 420) to compute motion vectors for another frame (at the end of the arrow 420). Arrows 420 shown above the frames 410 show motion vector computations occurring in the first pass and arrows 420 shown below the frames 410 relate to motion vector computations occurring in the second pass. For example, in the first pass, information from frame $I_0$ is used to compute motion vectors for frame $P_1$. In the second pass, information from frame $P_4$ and $I_0$ is used to compute motion vectors for frame $B_2$.

As shown in FIG. 4, in the first pass, motion vectors are computed for frames 1 through 4 by using the information from a preceding frame (i.e., motion vectors for frames 1 through 4 are computed as if the final encoding were to be carried out using all P-frames). In the first pass, the number of B-frames to be encoded in the set of successive frames 400 is also determined (as described below in relation to FIG. 5). In the example shown in FIG. 4, it has been determined that three B-frames are to be encoded in the set of successive frames 400.

In the second pass, the determined number of B-frames is encoded (as frames $B_1$, $B_2$, and $B_3$) with the next frame being encoded as a P-frame (frame $P_4$). As shown in FIG. 4, new motion vector computations must be performed to compute new motion vectors in the second pass to encode the B-frames and P-frames. For example, arrows 425 and 430 indicate new motion vector computations that are performed in the second pass. For a motion vector from the first pass to be re-used in the second pass, one condition must be met: 1) the information needed to compute the motion vector must be the same in both passes (i.e., the information must originate from the same frame in both passes).

For example, as shown in FIG. 4, information from frame $I_0$ is used to compute motion vectors for frame $P_1$ in the first pass. In other words, frame $I_0$ is referenced by frame $P_1$ in the first pass. In the second pass, information from frame $I_0$ is also needed to compute motion vectors for frame $B_1$. In other words, frame $I_0$ is also referenced by frame $B_0$ in the second pass. As such, the motion vectors computed for frame $P_1$ in the first pass may be re-used for encoding frame $B_1$ in the second pass. The motion vector computations producing motion vectors for frame $P_1$ in the first pass that are re-used in the second pass are indicated by the dashed arrow 435. Since a B-pixelblock typically uses two motion vectors, one computed from a past frame and one from a future frame, the encoding of frame $B_1$ in the second pass will also require a new motion vector computed with reference to frame $P_4$.

Figure 5:
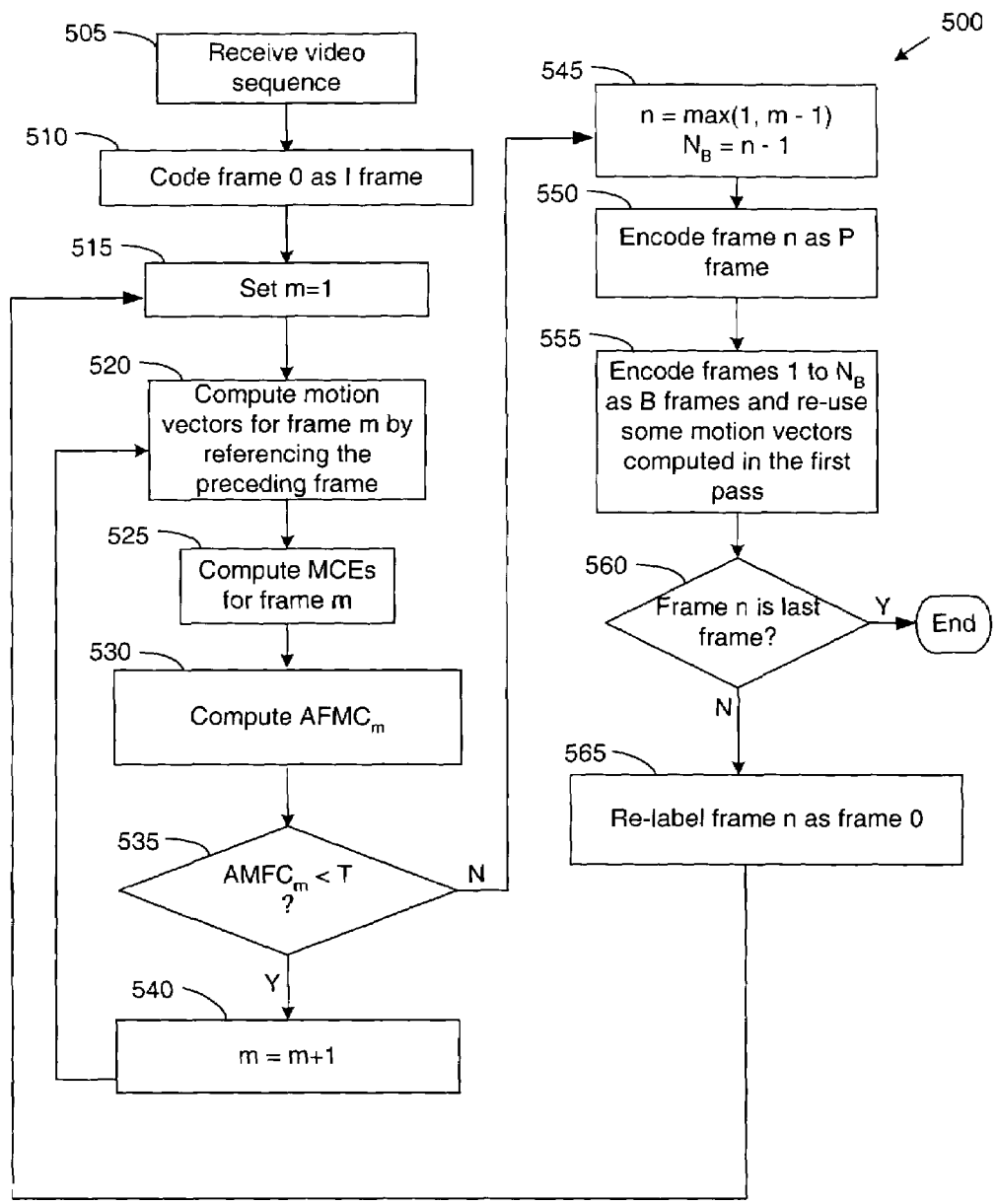
FIG. 5 is a flowchart of a method for encoding a video sequence in two passes where some motion vectors computed in the first pass are re-used in the second pass.

FIG. 5 is a flowchart of a method 500 for encoding a video sequence in two passes where some motion vectors computed in the first pass are re-used in the second pass. The method 500 may be performed, for example, by the encoding component 110. The method 500 commences by receiving (at 505) a video sequence. The video sequence comprises a plurality of video frames indexed by m from 0 through N, where m is a positive integer. Each frame of the video sequence is comprised of a plurality of pixels having one or more pixel values (for example, luminance (Y) and/or chrominance (U, V) values). Each frame is divided into sets of pixels called pixelblocks.

The method then encodes (at 510) frame 0 of the plurality of video frames as an I-frame. The method then sets (at 515) a counter m to equal 1. The method computes (at 520) motion vectors for pixelblocks of frame m using information from a preceding frame m−1, i.e., motion vectors for pixelblocks of frame m are computed as if frame m were to be encoded as a P-frame. A graphical illustration of step 520 is shown in FIG. 4. The method then determines (at 525) a motion compensation error (MCE) for the pixelblocks of frame m. In an alternative embodiment, the MCE for the pixelblocks of frame m is not computed.

The method then determines (at 530) an average frame motion cost ($AFMC_m$) of frames 1 through m, the average frame motion cost being computed by adding the individual frame motion costs of frames 1 through m and dividing the result by m. The motion cost of an individual frame is computed by summing the motion cost for each pixelblock of the frame, the pixelblock motion cost being proportional to the MCE value of the pixelblock and the total number of bits that are required to encode the motion vector. In an alternative embodiment, the pixel motion cost only comprises the MCE value of the pixelblock. In a further embodiment, the pixelblock motion cost only comprises the total number of bits required to encode the motion vector for the pixelblock. In yet a further embodiment, the method determines (at 530) a frame motion cost ($FMC_m$) of each individual frame m.

The method then determines (at 535) if the $AFMC_m$ value of frames 1 through m is less than a predetermined threshold T. In some embodiments, the value of threshold T is determined experimentally. In some embodiments, the value of threshold T is different for different types of video sequences, e.g., a different threshold value may be used for video sequences of sports, soap operas, news reports, old movies, videoconference sequences, etc. In further embodiments, the method determines (at 535) if the $AFMC_m$ value is less than a predetermined threshold $T_m$, where $T_m$ represents a set of predetermined thresholds that vary in value depending on the value of counter m. For example, the value of $T_m$ may monotonically decrease as the value of m increases, thereby making it more difficult to add more B frames to be encoded by increasing the value of counter m. In yet a further embodiment, the method determines (at 535) if the $FMC_m$ value of frame m is less than a predetermined threshold T.

If the method determines (at 535) that the $AFMC_m$ value is less than the predetermined threshold T, the method increases (at 540) the counter m by one and continues at step 520. If the method determines (at 535) that the $AFMC_m$ value is not less than the predetermined threshold T, the method sets (at 545) a variable n to equal the maximum of 1 or (m−1) so that the minimum value of n is 1. Note that the value of n represents the largest number of frames for which the average frame motion cost ($AFMC_n$) is still below the predetermined threshold T. The method also sets the number ($N_B$) of B-frames to be encoded to equal n−1.

The first pass of operations of the method 500 is comprised of steps 515 through 545 and determines the number ($N_B$) of B-frames to be encoded in the set of successive frames from 1 through n. The number ($N_B$) of B-frames to be encoded increases until the average frame motion cost ($AFMC_n$) of the successive frames exceeds the predetermined threshold T and is then set to equal one less than the largest value of n for which $AFMC_n$ is still below the predetermined threshold T. As such, the number ($N_B$) of B-frames to be encoded in a set of successive frames is dependent on the average frame motion cost of the set of successive frames.

The second pass of operations of the method 500 is comprised of steps 550 through 555. At step 550, the method encodes frame n as a P-frame. The method then encodes (at 555) frames 1 through $N_B$ as B-frames by re-using some motion vectors computed in the first pass (steps 515 through 545). In some embodiments, the motion vectors for the pixelblocks of frame 1 computed in the first pass are re-used to compute the motion vectors for pixelblocks of frame 1 in the second pass, as illustrated graphically in FIG. 4.

The method 500 then determines (at 560) if frame n is the last frame of the video sequence (i.e., if frame n is frame N). If so, the method ends. If frame n is not the last frame of the video sequence, the method then re-labels frame n as frame 0 in the video sequence so that frame n+1 is re-labeled as frame 1, frame n+2 is re-labeled as frame 2, etc. The method then continues at step 515.

In an alternative embodiment, the two pass partial motion vector re-use method of FIG. 5 is optimized for encoding a video sequence with a relatively high number of scene cuts (i.e., a relatively high number of frames with discontinuous content). Such video sequences may be found, for example, in music videos, sports broadcasts, etc. In the alternative embodiment, a scene cut detection method is used where an impulse-like variation in the motion costs of two successive frames (which typically indicates a scene change) is monitored.

Figure 6:
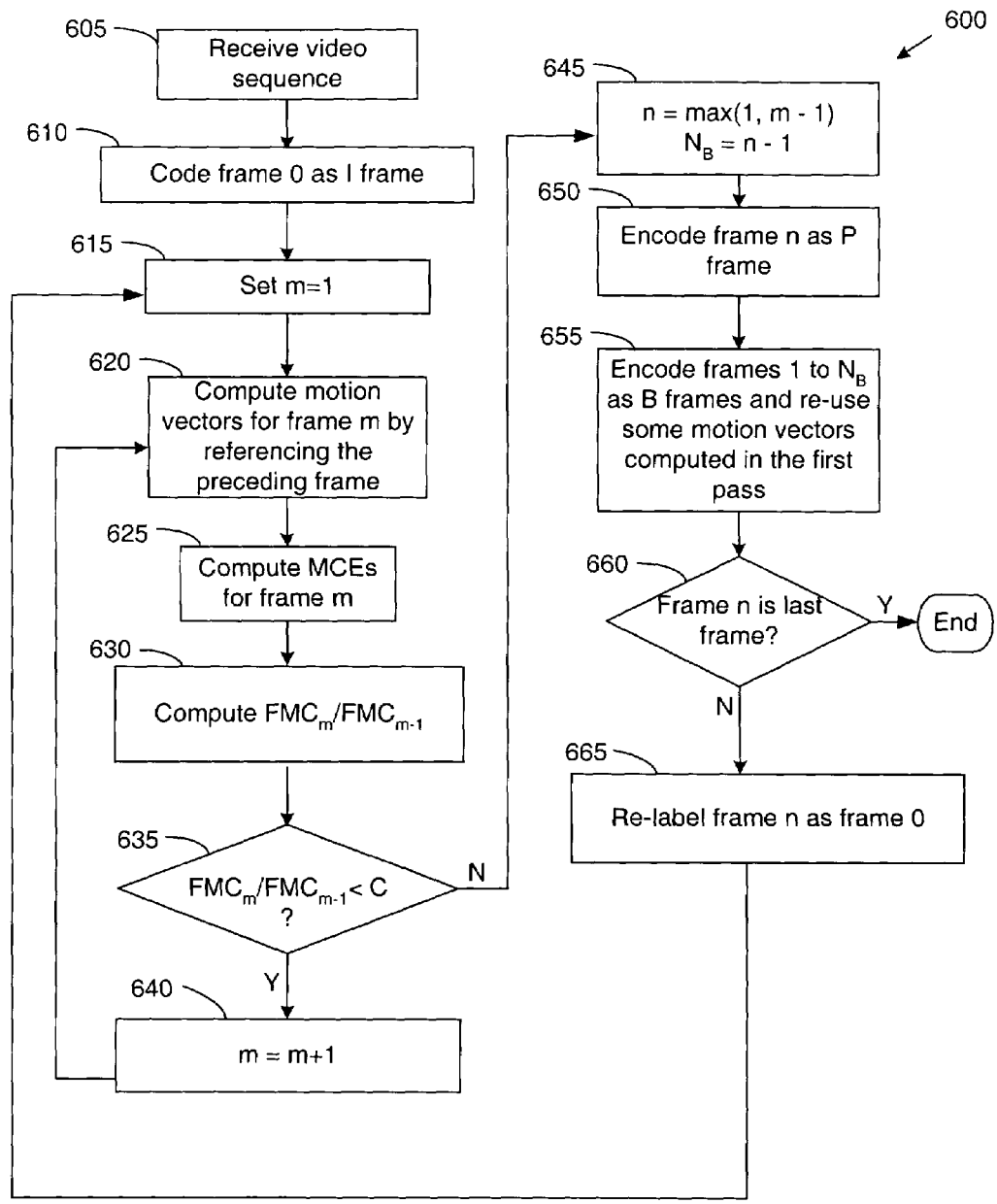
FIG. 6 is a flowchart of the two pass partial re-use method of FIG. 5 combined with a scene cut detection method in accordance with the present invention.

FIG. 6 graphically depicts a flowchart of the two pass partial re-use method of FIG. 5 combined with a scene cut detection method in accordance with the present invention. The method of FIG. 6 is similar to the method of FIG. 5 and only those steps that differ are discussed in detail here. The method 600 may be performed, for example, by the encoding component 110.

The method 600 commences by receiving (at 605) a video sequence. The video sequence comprises a plurality of video frames labeled from 0 through N where each frame is divided into sets of pixels called pixelblocks. The method then encodes (at 610) frame 0 of the plurality of video frames as an I-frame. The method then sets (at 615) a counter m to equal 1. The method computes (at 620) motion vectors for pixelblocks of frame m using information from the preceding frame. The method then determines (at 625) a motion compensation error (MCE) for the pixelblocks of frame m. In an alternative embodiment, the MCE for the pixelblocks of frame m is not computed.

The method then determines (at 630) a frame motion cost ($FMC_m$) of frame m by summing the total number of bits required to encode the motion vector and/or the MCE value of each pixelblock of frame m. The method also determines (at 630) a frame motion cost ($FMC_{m-1}$) of a frame immediately preceding frame m by summing the total number of bits required to encode the motion vector and/or the MCE value for each pixelblock of frame m−1. The method then computes (at 630) the value of $FMC_m/FMC_{m-1}$. During the first iteration of the method 600 where frame m−1 is an I-frame, however, the value of $FMC_m/FMC_{m-1}$ is set to equal 0. Since the frame motion cost of an I-frame is 0, this prevents a division operation where the divisor is 0.

The method then determines (at 635) if the value of $FMC_m/FMC_{m-1}$, is less than a predetermined threshold C. In some embodiments, the value of threshold C is determined experimentally. In some embodiments, the value of threshold C is different for different types of video sequences, e.g., a different threshold value may be used for video sequences related to sports, soap operas, news reports, old movies, videoconference sequences, etc. In further embodiments, the method determines (at 635) if the value of $FMC_m/FMC_{m-1}$ is less than a predetermined threshold $C_m$, where $C_m$ represents a set of predetermined thresholds that vary in value depending on the value of counter m. The value of m indicates the current number of frames to be coded as B frames since the last coding of a P frame in the video sequence. For example, the value of $C_m$ may monotonically decrease as the value of m increases, thereby making it more difficult to encode more frames as B-frames by increasing the value of m.

The value of $FMC_m/FMC_{m-1}$ reflects a relative increase in motion cost between two successive frames (frames m and m−1). A relatively high value for $FMC_m/FMC_{m-1}$ indicates that the motion cost of frame m is substantially higher than the motion cost of frame m−1. Such an impulse-like increase in the motion costs between two successive frames typically indicates a scene cut between the two successive frames, i.e., the content of the two successive frames is not continuous. The value of the predetermined threshold C (to which the value of $FMC_m/FMC_{m-1}$ is compared (at step 630)) can be determined experimentally so that a value of $FMC_m/FMC_{m-1}$ that is equal to or greater than the threshold C most likely indicates a scene cut between frames m and m−1.

If the method determines (at 635) that the value of $FMC_m/FMC_{m-1}$ is less than the predetermined threshold C, the method increases (at 640) the counter m by one and continues at step 620. If the method determines (at 635) that the value of $FMC_m/FMC_{m-1}$ is not less than the predetermined threshold C, the method sets (at 645) a variable n to equal the maximum of 1 or (m−1) and also sets the number ($N_B$) of B-frames to be encoded to equal n−1. The first pass of operations of the method 600 is comprised of steps 615 through 645 and determines the number ($N_B$) of B-frames to be encoded in the set of successive frames from 1 through n.

Note that the value of n represents the largest number of frames for which the value of $FMC_n/FMC_{n-1}$ is still below the predetermined threshold C. Therefore, frame n is the frame immediately before a detected scene cut and frame n+1 is the frame immediately after the detected scene cut (as discussed below in relation to FIG. 7).

The second pass of operations of the method 600 is comprised of steps 650 through 655. At step 650, the method encodes frame n (the frame immediately prior to the detected scene cut) as a P-frame. As such, the method of FIG. 6 ensures that the frame immediately prior to a detected scene cut is encoded as a P-frame. This ensures that the frame before the scene cut will not reference a frame that is placed after the scene cut (if such would happen, the bit rate would increase). The method then encodes (at 655) frames 1 through $N_B$ as B-frames by re-using some motion vectors computed in the first pass (steps 615 through 645).

The method 600 then determines (at 660) if frame n is the last frame of the video sequence. If so, the method ends. If frame n is not the last frame of the video sequence, the method then re-labels frame n as frame 0 in the video sequence so that frame n+1 is re-labeled as frame 1, frame n+2 is re-labeled as frame 2, etc. The method then continues at step 615.

Figure 7:
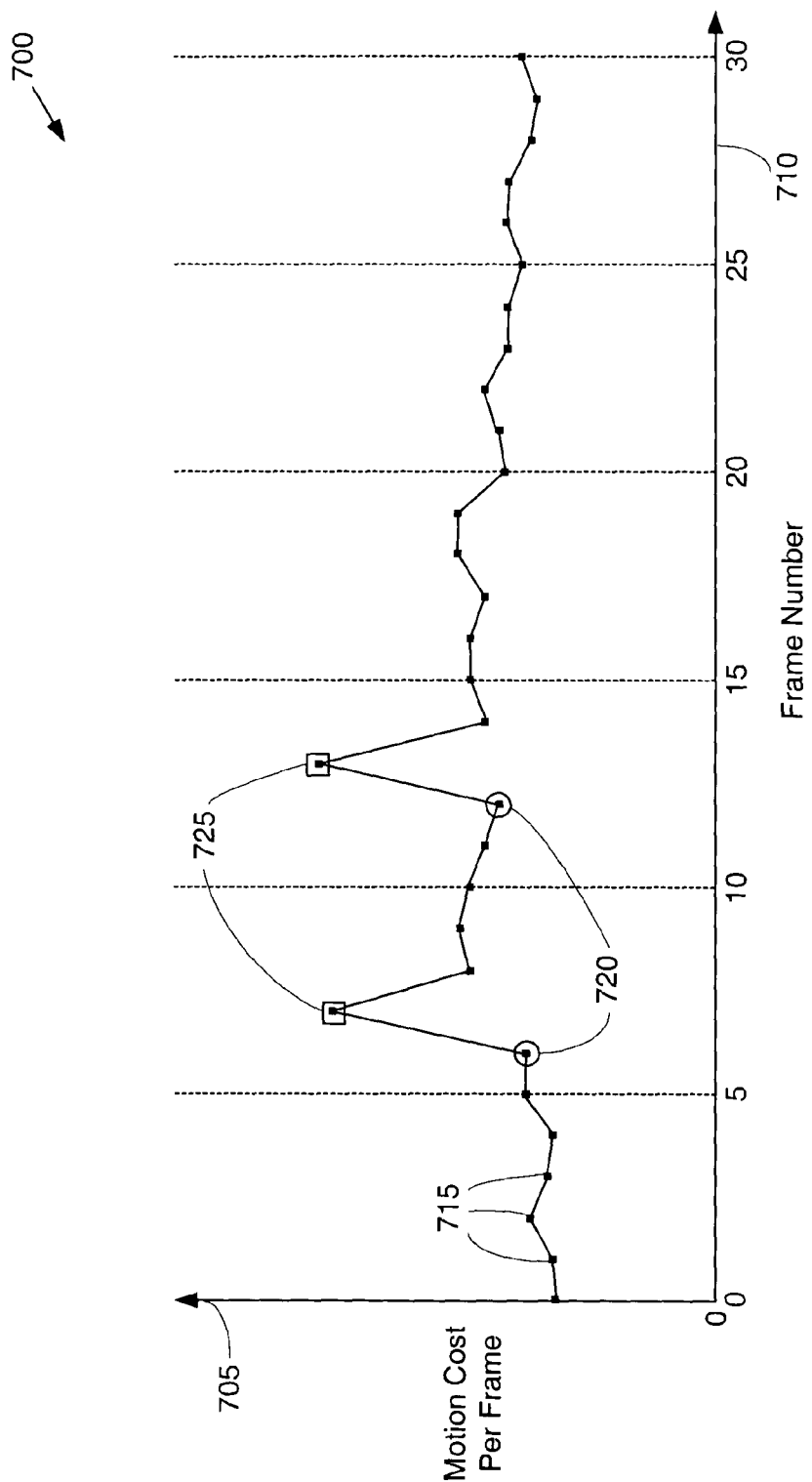
FIG. 7 shows a graph of the motion cost per frame of a series of frames in a video sequence.

FIG. 7 shows a graph 700 of the motion cost per frame of a series of frames in a video sequence. FIG. 7 is described in relation to FIG. 6. The motion cost per frame is shown on a first axis 705 and the frame number of individual frames in the video sequence is shown on a second axis 710. The motion costs of individual frames are marked by dots 715. A frame immediately before a scene cut is marked by a dot within a circle 720 and a frame immediately after a scene cut is marked by dot within a square 725. Frames immediately before a scene cut are encoded as P-frames (at step 650).

Note that the motion cost of a frame immediately after a scene cut is significantly higher than the motion cost of a frame immediately before the scene cut. As such, the ratio of the motion cost of the frame immediately after a scene cut to the motion cost of the frame immediately before the scene cut (i.e., $FMC_m/FMC_{m-1}$) will have a relatively high value. A relatively high value for $FMC_m/FMC_{m-1}$ typically indicates a scene cut between the two successive frames (frames m and m−1) and will likely exceed the predetermined threshold C to which the value of $FMC_m/FMC_{m-1}$ is compared (at step 630).

The scene cut detection method discussed in relation to FIG. 6 provides a simple and effective method of detecting scene cuts in a video sequence. In an alternative embodiment, the scene cut detection method is not used in conjunction with the two-pass partial re-use method of FIG. 5 but is used independently to identify scene cuts in a video sequence.

Figure 8:
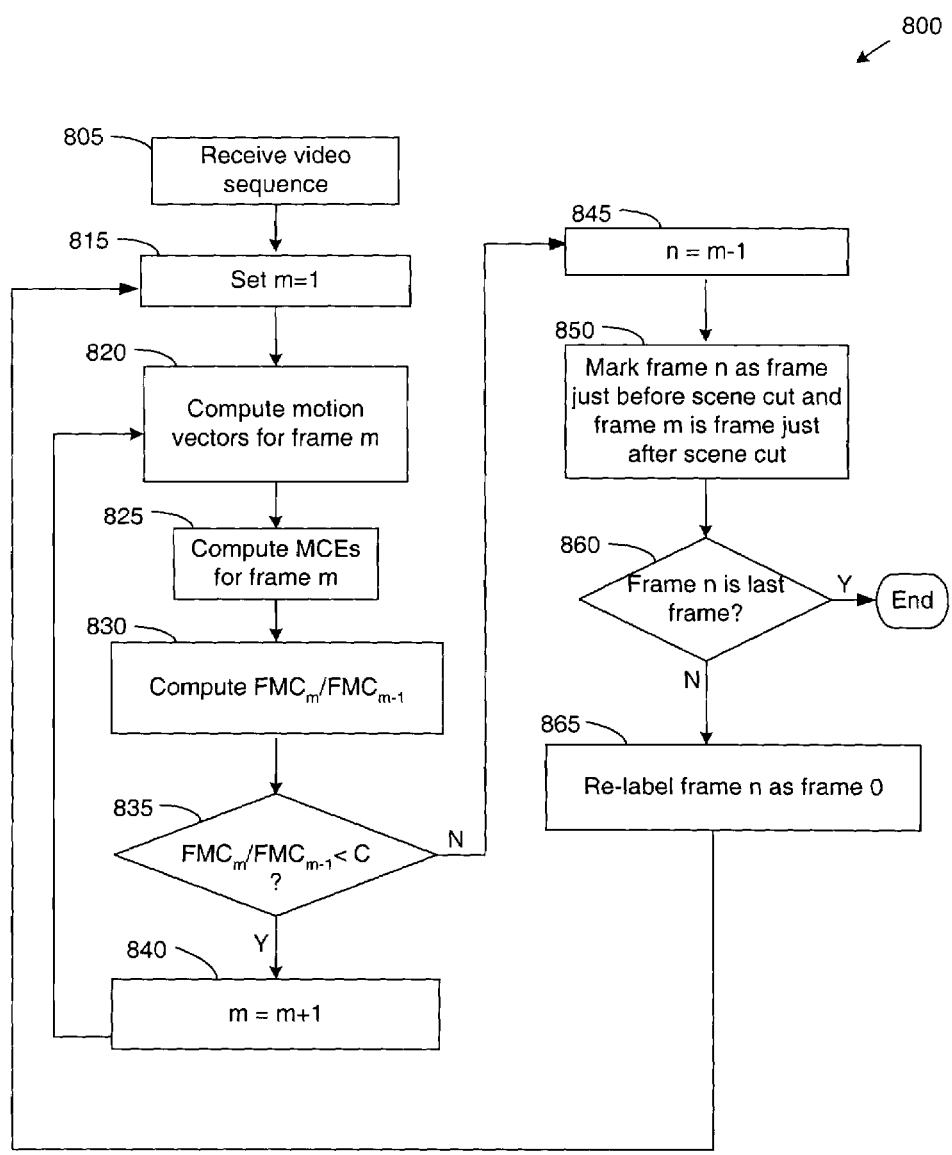
FIG. 8 is a flowchart of a method for identifying scene cuts in a video sequence.

FIG. 8 is a flowchart of a method 800 for identifying scene cuts in a video sequence. As used herein, a video sequence with a relatively high number of scene cuts has a relatively high number of frames with discontinuous content, a scene cut being a point in time when the content in the video sequence is discontinuous. The method of FIG. 8 is similar to the method of FIG. 6 and only those steps that differ are discussed in detail here. The method 800 may be performed, for example, by the encoding component 110.

The method 800 commences by receiving (at 805) a video sequence. The video sequence comprises a plurality of video frames labeled from 0 through N where each frame is divided into sets of pixels called pixelblocks. The method then sets (at 815) a counter m to equal 1. The method computes (at 820) motion vectors for pixelblocks of frame m using information from a preceding frame or information from a preceding and future frame, i.e., frame m can be treated as a P-frame or B-frame. The method then determines (at 825) a motion compensation error (MCE) for pixelblocks of frame m. In an alternative embodiment, the MCE for the pixelblocks of frame m is not computed.

The method then determines (at 830) a frame motion cost ($FMC_m$) of frame m and the frame motion cost ($FMC_{m-1}$) of a frame immediately preceding frame m. The method then computes (at 830) the value of the ratio $FMC_m/FMC_{m-1}$. During the first iteration of the method 800 where frame m−1 is an I-frame, however, the value of $FMC_m/FMC_{m-1}$ is set to equal 0. Since the frame motion cost of an I-frame is 0, this prevents a division operation where the divisor is 0.

The method then determines (at 835) if the value of $FMC_m/FMC_{m-1}$ is less than a predetermined threshold C or Cm. If the method determines (at 835) that the value of $FMC_m/FMC_{m-1}$ is less than the predetermined threshold C, the method increases (at 840) the counter m by one and continues at step 820. If the method determines (at 835) that the value of $FMC_m/FMC_{m-1}$ is not less than the predetermined threshold C (i.e., that the value of $FMC_m/FMC_{m-1}$ is equal to or greater than the predetermined threshold C), the method sets (at 845) a variable n to equal m−1. The method then marks (at 850) frame n as a frame immediately before a detected scene cut and frame m as a frame immediately after a detected scene cut. As such, the method 800 determines if there is a scene cut between frames m and m−1 based on the value of the ratio $FMC_m/FMC_{m-1}$.

The method 800 then determines (at 860) if frame n is the last frame of the video sequence. If so, the method ends. If frame n is not the last frame of the video sequence, the method then re-labels frame n as frame 0 in the video sequence so that frame n+1 is re-labeled as frame 1, frame n+2 is re-labeled as frame 2, etc. The method then continues at step 815.

Section II: Full Re-use of Motion Vectors Determined in a First Pass

In most conventional video encoders, the process of computing motion vectors consumes a significant amount of computational resources. Thus, in encoding frames of a video sequence, it is advantageous to minimize the number of motion vector computations as much as possible. In the two pass encoding method of the present invention, therefore, it is advantageous to re-use in the second pass as many of the motion vectors computed in the first pass as possible so that fewer new motion vectors need to be computed in the second pass.

In an alternative embodiment, all motion vectors computed in the first pass are re-used in the second pass to provide full re-use of motion vectors. The full re-use method is similar to the partial re-use method described above in Section I except that, in the first pass, motion vectors for each frame are computed by using information from a same reference frame (frame 0) instead of a preceding frame (as in the partial re-use method). Then during the second pass, each motion vector determined in the first pass is re-used in the second pass to encode B-frames and P-frames in a set of successive frames.

Figure 9:
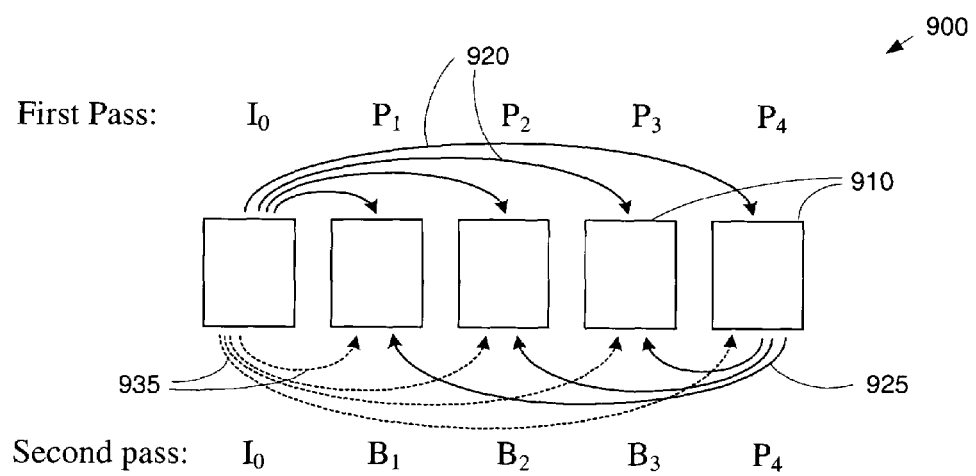
FIG. 9 is a graphical illustration of a set of successive frames that are processed in two passes with full re-use of motion vectors computed in the first pass.

FIG. 9 is a graphical illustration of a set of successive frames 900 that are processed in two passes with full re-use of motion vectors computed in the first pass. The set of successive frames 900 is comprised of five frames 910 that are shown in display order. As shown in FIG. 9, for the first and second passes, each frame 910 is identified by a frame type (I, P, or B) and a subscripted number (1 through 4) indicating the display order of the frame in the set of successive frames 900.

Arrows 920 indicate motion vector computations using information from a frame (at the start of the arrow 920) to compute motion vectors for another frame (at the end of the arrow 920). Arrows 920 shown above the frames 910 show motion vector computations occurring in the first pass and arrows 920 shown below the frames 910 relate to motion vector computations occurring in the second pass. As shown in FIG. 9, in the first pass, motion vectors are computed for frames 1 through 4 by using the information from a same past reference frame (frame 0). As such, motion vectors for frames 1 through 4 are computed as if the final encoding were to be carried out using all P-frames where each P-frame references frame 0. In the example shown in FIG. 9, it has been determined in the first pass that three B-frames are to be encoded in the set of successive frames 900.

In the second pass, the determined number of B-frames is encoded (as frames $B_1$, $B_2$, and $B_3$) with the next frame being encoded as a P-frame (frame $P_4$). As shown in FIG. 9, new motion vector computations must be performed to compute new motion vectors in the second pass to encode the B-frames and P-frames. For example, arrow 925 indicates a new motion vector computation that is performed in the second pass.

Note, however, that all motion vectors computed in the first pass may be re-used in the second pass since the condition for re-using a motion vector (the information originates from the same frame in both passes) is met for each motion vector computed in the first pass. For example, information from frame $I_0$ is used to compute motion vectors for frame $P_3$ in the first pass. In the second pass, information from frame $I_0$ is also needed to compute motion vectors for frame $B_3$. As such, the motion vectors computed for frame $P_3$ in the first pass may be re-used for encoding frame $B_3$ in the second pass.

By a similar analysis, in the second pass, frames $B_1$, $B_2$, and $P_4$ may also re-use motion vectors computed for frames $P_1$, $P_2$, and $P_4$, respectively, in the first pass. The motion vector computations producing motion vectors for a frame in the first pass that are re-used in the second pass are indicated by dashed arrows 935. Since a B-pixelblock typically uses two motion vectors, one computed from a past frame and one from a future frame, the encoding of frames $B_1$, $B_2$, and $B_3$ in the second pass will also require new motion vectors computed from the information of frame $P_4$.

Figure 10:
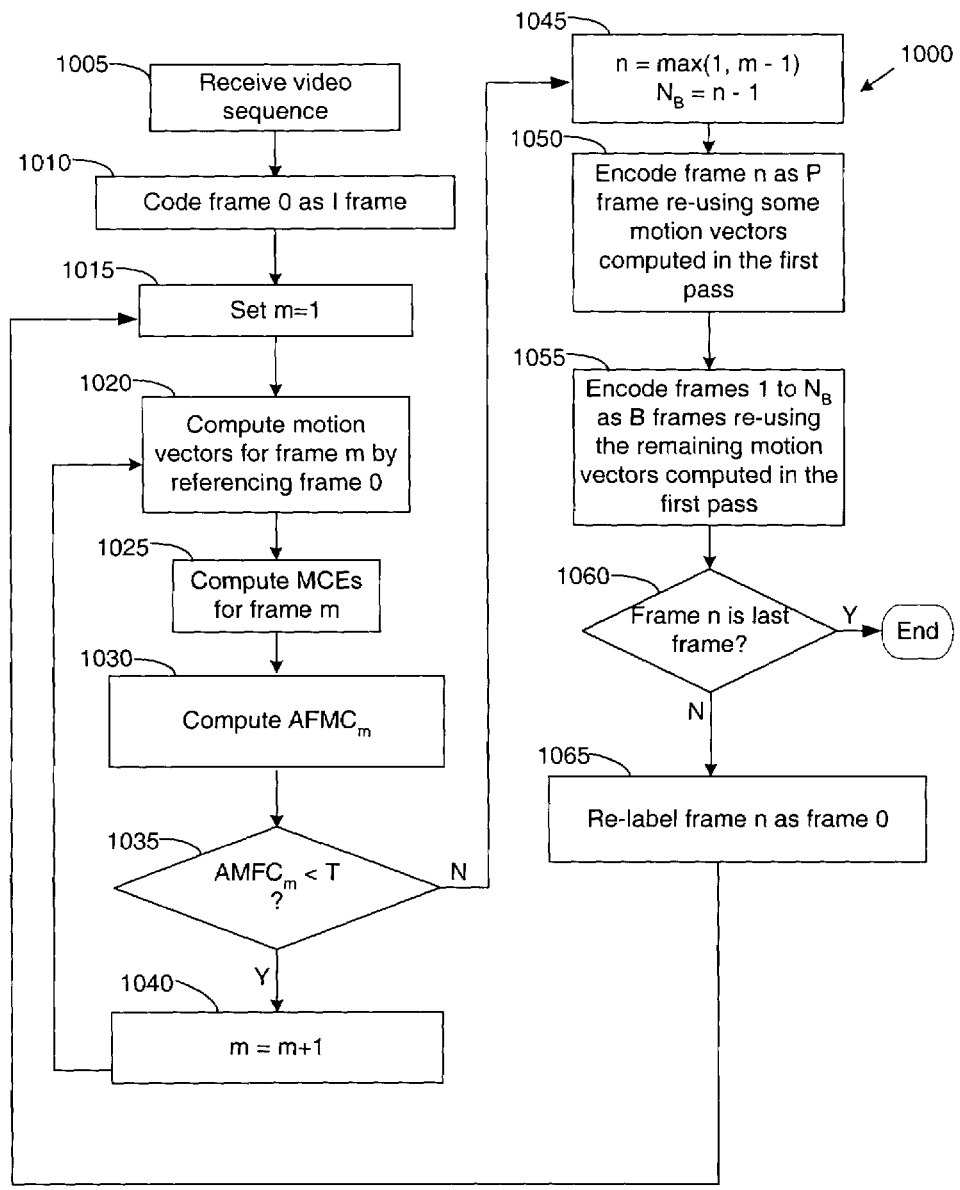
FIG. 10 is a flowchart of a method for encoding a video sequence in two passes where all motion vectors computed in the first pass are re-used in the second pass.

FIG. 10 is a flowchart of a method 1000 for encoding a video sequence in two passes where all motion vectors computed in the first pass are re-used in the second pass. The method of FIG. 10 is similar to the method of FIG. 5 and only those steps that differ are discussed in detail here. The method 600 may be performed, for example, by the encoding component 110.

The method 1000 commences by receiving (at 1005) a video sequence. The video sequence comprises a plurality of video frames labeled from 0 through N. Each frame is divided into sets of pixels called pixelblocks. The method then encodes (at 1010) frame 0 of the plurality of video frames as an I-frame. The method then sets (at 1015) a counter m to equal 1. The method computes (at 1020) motion vectors for pixelblocks of frame m using information from past frame 0 (i.e., motion vectors of frame m are computed as if frame m is to be encoded as a P-frame that references past frame 0). A graphical illustration of step 1020 is shown in FIG. 9. The method then determines (at 1025) a motion compensation error (MCE) for the pixelblocks of frame m. In an alternative embodiment, the MCE for the pixelblocks of frame m is not computed.

The method then determines (at 1030) an average frame motion cost ($AFMC_m$) of frames 1 through m. In an alternative embodiment, the method determines (at 1030) a frame motion cost ($FMC_m$) of individual frame m. The method then determines (at 1035) if the $AFMC_m$ value of frames 1 through m is less than a predetermined threshold T. In an alternative embodiment, the method determines (at 1035) if the $AFMC_m$ value is less than a predetermined threshold $T_m$, where $T_m$ represents a set of predetermined thresholds that vary in value depending on the value of counter m.

If the method determines (at 1035) that the $AFMC_m$ value is less than the predetermined threshold T, the method increases (at 1040) the counter m by one and continues at step 1020. If the method determines (at 1035) that the $AFMC_m$ value is not less than the predetermined threshold T, the method sets (at 1045) a variable n to equal the maximum of 1 or (m−1) so that the minimum value of n is 1. The method also sets the number ($N_B$) of B-frames to be encoded to equal n−1.

The first pass of operations of the method 1000 is comprised of steps 1015 through 1045 and determines the number ($N_B$) of B-frames to be encoded in the set of successive frames from 1 through n. The second pass of operation of the method 1000 is comprised of steps 1050 through 1055. At step 1050, the method encodes frame n as a P-frame by re-using some motion vectors computed in the first pass. In some embodiments, the motion vectors for the pixelblocks of frame n computed in the first pass is re-used to compute the motion vectors for pixelblocks of frame n in the second pass, as illustrated graphically in FIG. 9. The method then encodes (at 1055) frames 1 through $N_B$ as B-frames by re-using the remaining motion vectors computed in the first pass. In some embodiments, the motion vectors for the pixelblocks of frames 1 through $N_B$ (being P-frames) computed in the first pass are re-used to compute the motion vectors for pixelblocks of frames 1 through $N_B$ (being B-frames) in the second pass, as illustrated graphically in FIG. 9.

The method 1000 then determines (at 1060) if frame n is the last frame of the video sequence. If so, the method ends. If frame n is not the last frame of the video sequence, the method then re-labels frame n as frame 0 in the video sequence so that frame n+1 is re-labeled as frame 1, frame n+2 is re-labeled as frame 2, etc. The method then continues at step 1015.

Figure 11:
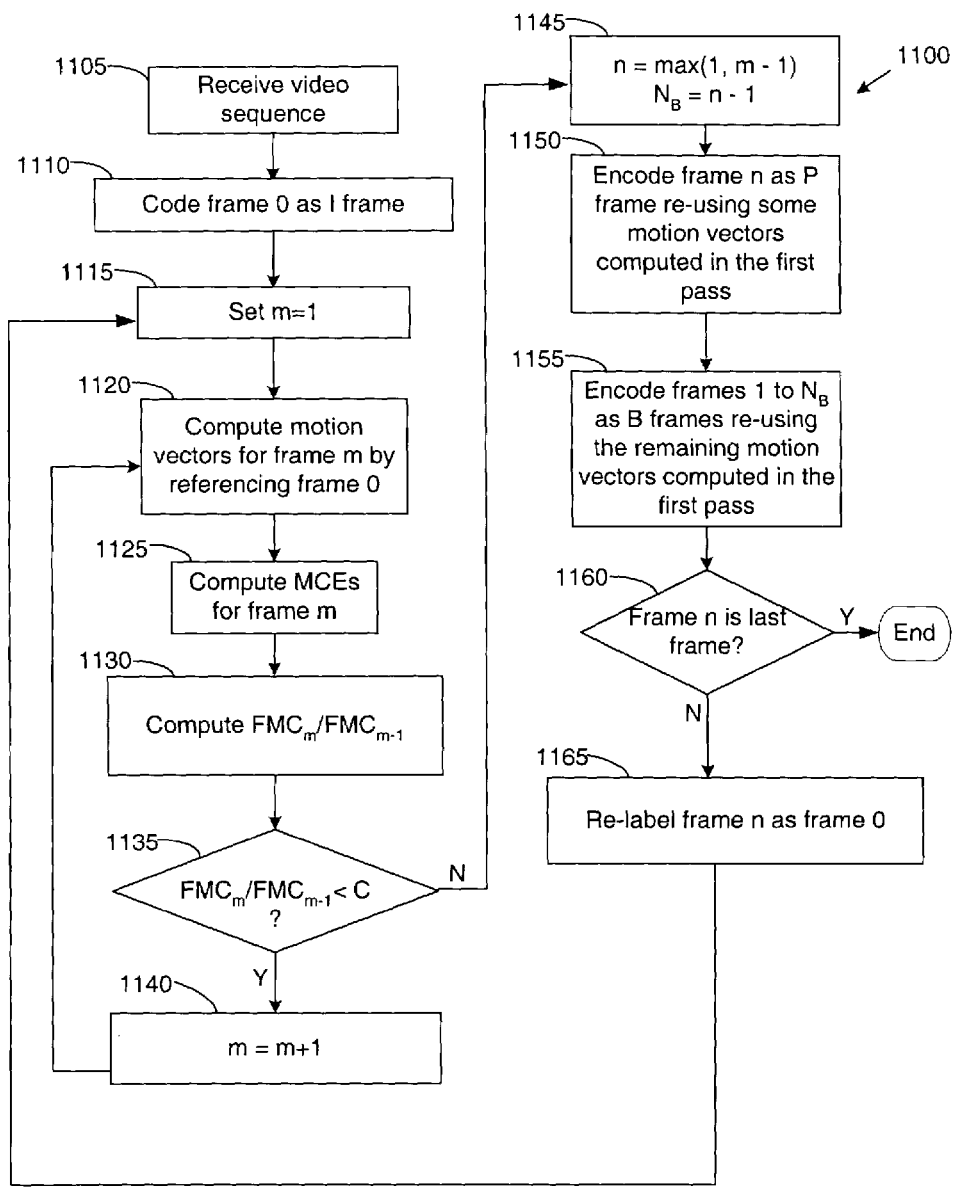
FIG. 11 is a flowchart of the two pass full re-use method of FIG. 10 combined with a scene cut detection method in accordance with the present invention.

FIG. 11 is a flowchart of the two pass full re-use method of FIG. 10 combined with a scene cut detection method in accordance with the present invention. The method of FIG. 11 is similar to the methods of FIGS. 6 and 10 and only those steps that differ are discussed in detail here. The method 1100 may be performed, for example, by the encoding component 110.

The method 1100 commences by receiving (at 1105) a video sequence comprised of a plurality of video frames labeled from 0 through N where each frame is divided into sets of pixels called pixelblocks. The method then encodes (at 1110) frame 0 of the plurality of video frames as an I-frame. The method then sets (at 1115) a counter m to equal 1. The method computes (at 1120) motion vectors for pixelblocks of frame m using information from frame 0.

The method then determines (at 1125) a motion compensation error (MCE) for the pixelblocks of frame m. In an alternative embodiment, the MCE for the pixelblocks of frame m is not computed.

The method then determines (at 1130) a frame motion cost ($FMC_m$) of frame m and a frame motion cost ($FMC_{m-1}$) of a frame immediately preceding frame m. The method then computes (at 1130) the value of $FMC_m/FMC_{m-1}$. During the first iteration of the method 1100 where frame m−1 is an I-frame, however, the value of $FMC_m/FMC_{m-1}$ is set to equal 0. Since the frame motion cost of an I-frame is 0, this prevents a division operation where the divisor is 0.

The method then determines (at 1135) if the value of $FMC_m/FMC_{m-1}$ is less than a predetermined threshold C or $C_m$. If the method determines (at 1135) that the value of $FMC_m/FMC_{m-1}$ is less than the predetermined threshold C, the method increases (at 1140) the counter m by one and continues at step 1120. If the method determines (at 1135) that the value of $FMC_m/FMC_{m-1}$ is not less than the predetermined threshold C, the method sets (at 1145) a variable n to equal the maximum of 1 or (m−1) and also sets the number ($N_B$) of B-frames to be encoded to equal n−1.

The first pass of the method 1100 is comprised of steps 1115 through 1145 and determines the number ($N_B$) of B-frames to be encoded in the set of successive frames from 1 through n. The second pass of the method 1100 is comprised of steps 1150 through 1155. At step 1150, the method encodes frame n as a P-frame by using some motion vectors computed in the first pass. The method then encodes (at 1155) frames 1 through $N_B$ as B-frames by re-using the remaining motion vectors computed in the first pass.

The method 1100 then determines (at 1160) if frame n is the last frame of the video sequence. If so, the method ends. If frame n is not the last frame of the video sequence, the method then re-labels frame n as frame 0 in the video sequence so that frame n+1 is re-labeled as frame 1, frame n+2 is re-labeled as frame 2, etc. The method then continues at step 1115.

Figure 12:
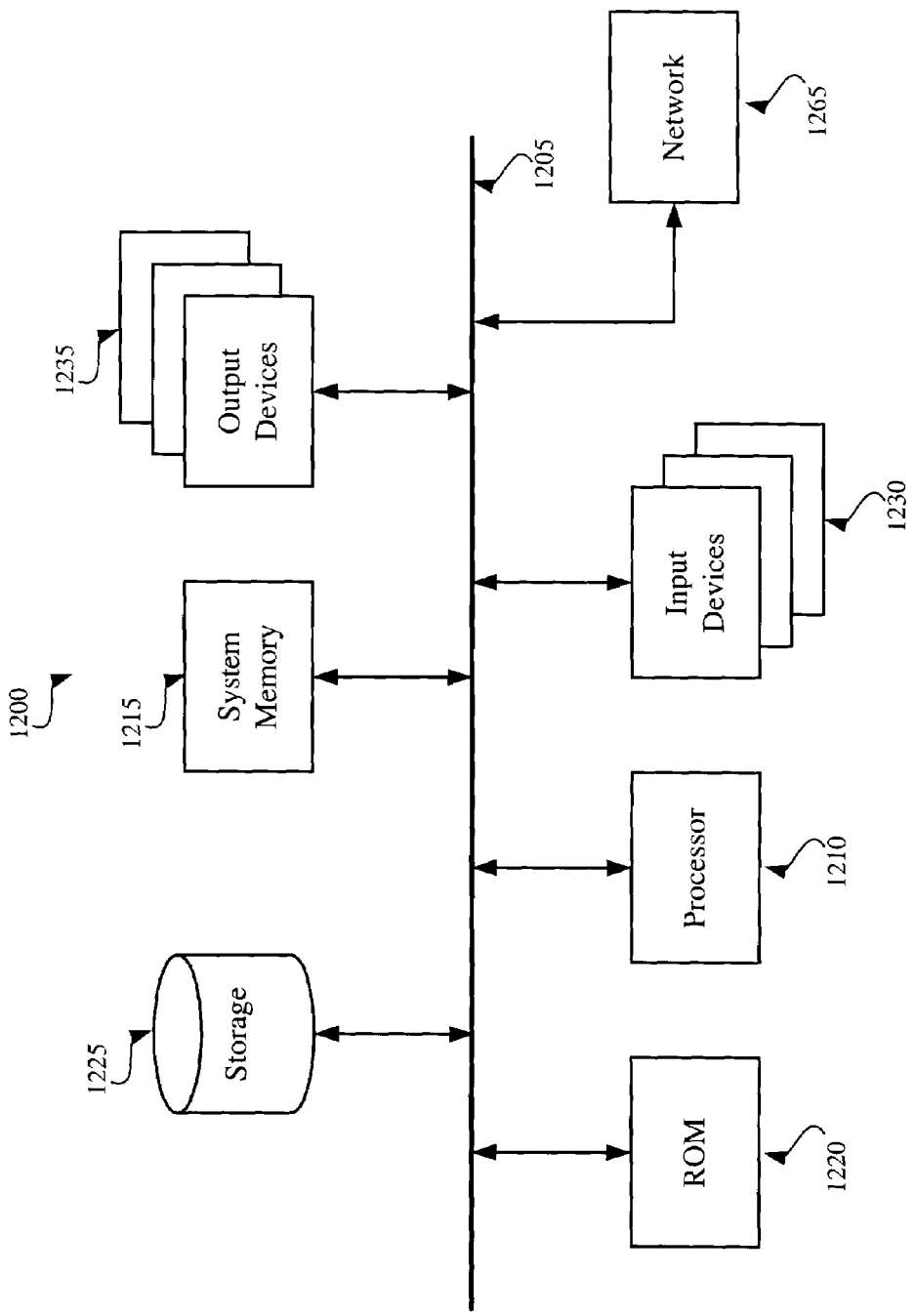
FIG. 12 presents a computer system with which some embodiments of the invention are implemented.

FIG. 12 presents a computer system with which some embodiments of the invention are implemented. Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225.

The read-only-memory (ROM) 1220 stores static data and instructions that are needed by the processor 1210 and other modules of the computer system. The permanent storage device 1225, on the other hand, is read-and-write memory device. This device is a non-volatile memory unit that stores instruction and data even when the computer system 1200 is off. Some embodiments of the invention use a mass-storage device (such as a magnetic or optical disk and its corresponding disk drive) as the permanent storage device 1225. Other embodiments use a removable storage device (such as a floppy disk or zip® disk, and its corresponding disk drive) as the permanent storage device. The permanent storage device may contain, for example, instructions of applications that perform methods of the present invention.

Like the permanent storage device 1225, the system memory 1215 is a read-and-write memory device. However, unlike storage device 1225, the system memory is a volatile read-and-write memory, such as a random access memory (RAM). The system memory stores some of the instructions and data that the processor needs at runtime. In some embodiments, the invention's processes are stored in the system memory 1215, the permanent storage device 1225, and/or the read-only memory 1220. From these various memory units, the processor 1210 retrieves instructions to execute and data to process in order to execute the processes of the invention.

The bus 1205 also connects to the input and output devices 1230 and 1235. The input devices enable the user to communicate information and select commands to the computer system. The input devices 1230 include alphanumeric keyboards and cursor-controllers. The output devices 1235 display images generated by the computer system. For instance, these devices display IC design layouts. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1200 may be used in conjunction with the invention. However, one of ordinary skill in the art would appreciate that any other system configuration may also be used in conjunction with the present invention.

Some embodiments described above relate to video frames in YUV format. One of ordinary skill in the art, however, will realize that these embodiments may also relate to a variety of formats other than YUV. In addition, other video frame formats (such as RGB) can easily be transformed into the YUV format. Furthermore, embodiments of the present invention may relate to various video encoding applications (e.g., DVD, digital storage media, television broadcasting, internet streaming, communication, teleconferencing, etc.) in real-time or post-time. Embodiments of the present invention may also be used with video sequences having different encoding standards such as H.263 and H.264 (also known as MPEG-4/Part 10).

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method of processing a plurality of frames to determine a number of bidirectional motion compensated (B) frames to be encoded in a set of successive frames in the plurality of frames, the method comprising:

a) computing motion vectors for at least one frame in the set of successive frames, wherein the computed motion vectors for each particular frame are based only on the particular frame and a preceding frame;

b) determining a motion cost value for at least one frame in the set of successive frames;

c) determining a derived cost value based on the motion cost value for at least one frame in the set of successive frames; and d) determining the number of B-frames to be encoded in the set of successive frames based on the derived cost value.

2. The method of claim 1, wherein the motion cost value of a frame is related to a number of bits required to encode the motion vectors of the frame.

3. The method of claim 2 further comprising, after step a) and before step b):

computing motion compensation errors (MCEs) for at least one frame in the set of successive frames, wherein the motion cost value of a frame is related to the number of bits required to encode the motion vectors and the MCEs of the frame.

4. The method of claim 1 wherein:

step b) comprises determining a motion cost value for a first and second frame in the set of successive frames; and the derived cost value is the average of the motion cost values for the first and second frames.

5. The method of claim 1 wherein:

step b) comprises determining a motion cost value for a first and second frame in the set of successive frames; and the derived cost value is a ratio between the motion cost value of the first frame and the motion cost value of the second frame.

6. A method of processing a plurality of frames to determine a number of bidirectional motion compensated (B) frames to be encoded in a set of successive frames in the plurality of frames, the method comprising:

a) computing motion vectors for at least one frame in the set of successive frames;

b) determining a motion cost value for at least one frame in the set of successive frames;

c) determining a derived cost value based on the motion cost value for at least one frame in the set of successive frames; and d) determining the number of B-frames to be encoded in the set of successive frames based on the derived cost value by comparing the derived cost value to a predetermined threshold value to determine the number of B-frames to be encoded in the set of successive frames, wherein the number of B-frames to be encoded increases as long as the derived cost value is below the predetermined threshold value.

7. The method of claim 6 wherein the predetermined threshold value varies as the number of B-frames to be encoded increases.

8. A method of encoding a video sequence in two passes, the video sequence comprising a plurality of frames, the method comprising:

a) performing a first pass of operations on a set of successive frames of the plurality of frames, the first pass of operations comprising:

computing motion vectors for at least one frame in the set of successive frames, wherein the computed motion vectors for each particular frame are based only on the particular frame and a preceding frame;

determining a motion cost value for at least one frame in the set of successive frames;

determining a derived cost value based on the motion cost value for at least one frame in the set of successive frames; and determining a number of bidirectional motion compensated (B) frames to be encoded in the set of successive frames based on the derived cost value; and b) performing a second pass of operations on the set of successive frames, the second pass of operations comprising:

encoding the determined number of frames in the set of successive frames as B-frames by using at least one motion vector computed in the first pass of operations.

9. The method of claim 8, wherein step b) further comprises encoding the next frame in the set of successive frames after the B-frames as a unidirectional motion compensated (P) frame.

10. A method of encoding a video sequence in two passes, the video sequence comprising a plurality of frames, the method comprising:

a) performing a first pass of operations on a set of successive frames of the plurality of frames, the first pass of operations comprising:

computing motion vectors for at least one frame in the set of successive frames, wherein computing motion vectors comprises computing motion vectors for a first and second frame in the set of successive frames, the motion vectors for the first frame being computed using information from a preceding frame and the motion vectors for the second frame being computed using information from the same preceding frame;

determining a motion cost value for at least one frame in the set of successive frames;

determining a derived cost value based on the motion cost value for at least one frame in the set of successive frames; and determining a number of bidirectional motion compensated (B) frames to be encoded in the set of successive frames based on the derived cost value; and b) performing a second pass of operations on the set of successive frames, the second pass of operations comprising:

encoding the determined number of frames in the set of successive frames as B-frames by using at least one motion vector computed in the first pass of operations.

11. The method of claim 10 wherein all of the motion vectors computed in step a) are used in step b).

12. A method of detecting scene cuts in a video sequence comprised of a plurality of frames, the method comprising:

a) computing motion vectors for a first frame and a second frame in the plurality of frames;

b) determining a motion cost value for the computed motion vectors of the first frame and the second frame;

c) determining a ratio between the motion cost value for the computed motion vectors of the first frame and the motion cost value for the computed motion vectors of the second frame; and d) determining if there is a scene cut between the first frame and the second frames based on the ratio.

13. The method of claim 12 wherein a scene cut is a point in time when the content in the video sequence is discontinuous.

14. The method of claim 12, wherein the motion cost value for the computed motion vectors of the first frame is related to a number of bits required to encode the motion vectors of the first frame and the motion cost value for the computed motion vectors of the second frame is related to a number of bits required to encode the motion vectors of the second frame.

15. A method of detecting scene cuts in a video sequence comprised of a plurality of frames, the method comprising:

a) computing motion vectors for a first frame and a second frame in the plurality of frames;

b) determining a motion cost value for the first frame and the second frame;

c) determining a ratio between the motion cost value of the first frame and the motion cost value of the second frame; and d) determining if there is a scene cut between the first frame and the second frames based on the ratio by determining if the ratio is less than a predetermined threshold value.

16. The method of claim 15, wherein the second frame is a frame immediately preceding the first frame in the plurality of frames.

17. The method of claim 16 further comprising:

e) marking the first frame as a frame immediately after a scene cut and the second frame as a frame immediately before the scene cut if it is determined that the ratio is not less than a predetermined threshold value.

18. A computer readable medium storing a computer program for processing a video sequence comprising a plurality of frames to determine a number of bidirectional motion compensated (B) frames to be encoded in a set of successive frames in the plurality of frames, the computer program executable by at least one processor, the computer program comprising sets of instructions for:

computing motion vectors for at least one frame in the set of successive frames, wherein the computed motion vectors for each particular frame are based only on the particular frame and a preceding frame;

determining a motion cost value for at least one frame in the set of successive frames;

determining a derived cost value based on the motion cost value for at least one frame in the set of successive frames; and determining the number of B-frames to be encoded in the set of successive frames based on the derived cost value.

19. The computer readable medium of claim 18, wherein the motion cost value of a frame is related to a number of bits required to encode the motion vectors of the frame.

20. The computer readable medium of claim 12, wherein:

the set of instructions for determining a motion cost value for at least one frame in the set of successive frames comprises a set of instructions for determining a motion cost value for a first and second frame in the set of successive frames; and the derived cost value is a ratio between the motion cost value of the first frame and the motion cost value of the second frame.

21. A computer readable medium storing a computer program for processing a video sequence comprising a plurality of frames to determine a number of bidirectional motion compensated (B) frames to be encoded in a set of successive frames in the plurality of frames, the computer program executable by at least one processor, the computer program comprising sets of instructions for:

computing motion vectors for at least one frame in the set of successive frames;
determining a motion cost value for at least one frame in the set of successive frames;
determining a derived cost value based on the motion cost value for at least one frame in the set of successive frames; and
determining the number of B-frames to be encoded in the set of successive frames based on the derived cost value by comparing the derived cost value to a predetermined threshold value to determine the number of B-frames to be encoded in the set of successive frames, wherein the number of B-frames to be encoded increases as long as the derived cost value is below the predetermined threshold value.

22. A computer readable medium storing a computer program for encoding a video sequence in two passes, the video sequence comprising a plurality of frames, the computer program executable by at least one processor, the computer program comprising sets of instructions for:
performing a first pass of operations on a set of successive frames of the plurality of frames, wherein performing the first pass of operations comprises:
computing motion vectors for at least one frame in the set of successive frames, wherein the computed motion vectors for each particular frame are based only on the particular frame and a preceding frame;
determining a motion cost value for at least one frame in the set of successive frames;
determining a derived cost value based on the motion cost value for at least one frame in the set of successive frames; and
determining a number of bidirectional motion compensated (B) frames to be encoded in the set of successive frames based on the derived cost value; and
performing a second pass of operations on the set of successive frames, wherein performing the second pass of operations comprises encoding the determined number of frames in the set of successive frames as B-frames by using at least one motion vector computed by performing the first pass of operations.

23. The computer readable medium of claim 22, wherein all of the motion vectors computed by performing the first pass of operations are used by performing the second pass of operations.

24. A computer readable medium storing a computer program for encoding a video sequence in two passes, the video sequence comprising a plurality of frames, the computer program executable by at least one processor, the computer program comprising sets of instructions for:
performing a first pass of operations on a set of successive frames of the plurality of frames, wherein performing the first pass of operations comprises:
computing motion vectors for at least one frame in the set of successive frames, wherein computing motion vectors comprises computing motion vectors for a first and second frame in the set of successive frames, the motion vectors for the first frame being computed using information from a preceding frame and the motion vectors for the second frame being computed using information from the same preceding frame;
determining a motion cost value for at least one frame in the set of successive frames;
determining a derived cost value based on the motion cost value for at least one frame in the set of successive frames; and
determining a number of bidirectional motion compensated (B) frames to be encoded in the set of successive frames based on the derived cost value; and
performing a second pass of operations on the set of successive frames, wherein performing the second pass of operations comprises encoding the determined number of frames in the set of successive frames as B-frames by using at least one motion vector computed by performing the first pass of operations.

25. A computer readable medium storing a computer program for detecting scene cuts in a video sequence comprised of a plurality of frames, the computer program executable by at least one processor, the computer program comprising sets of instructions for:
computing motion vectors for a first frame and a second frame in the plurality of frames;
determining a motion cost value for the computed motion vectors of the first frame and the second frame;
determining a ratio between the motion cost value for the computed motion vectors of the first frame and the motion cost value for the computed motion vectors of the second frame; and
determining if there is a scene cut between the first frame and the second frame based on the ratio.

26. A method for processing a sequence of video pictures, the method comprising:
a) determining a number of bidirectional motion compensated (B) video pictures for the sequence of video pictures based on a cost value associated with motion vectors that are based only on a particular video picture and a preceding video picture; and
b) encoding the sequence of video pictures using the determined number of B-video pictures.

27. The method of claim 26, wherein determining the number of B-video pictures comprises:
a) computing at least one motion vector for at least one video picture in the sequence of video pictures;
b) computing a cost value for at least one computed motion vector; and
c) determining whether the cost value is greater than a threshold value to determine the number of B-video pictures.

28. The method of claim 27 further comprising iteratively (a) computing at least one motion vector, (b) computing the cost value and (c) determining whether the cost value is greater than the threshold value, wherein the number of B-video pictures is a number of video pictures between the particular video picture and a reference video picture, wherein the particular video picture is a video picture that comprises a particular cost value that causes the cost value to be greater than the threshold value.

29. The method of claim 27, wherein the cost value comprises a bit value for encoding the computed motion vector.

30. The method of claim 27, wherein encoding the sequence comprises using at least one of the computed motion vectors.

31. The method of claim 30, wherein the preceding video picture is a video picture that is immediately preceding the particular video picture.

32. The method of claim 27, wherein encoding the sequence comprises using all of the computed motion vectors.

33. The method of claim 32, wherein the preceding video picture is an I-video picture preceding the particular video picture.

34. The method of claim 26 further comprising:
a) determining a relationship between a motion vector cost value for a first video picture and a motion vector cost value for a second video picture; and
b) determining whether there is a scene cut between the first video picture and the second video picture based on the relationship.

35. A method for processing a sequence of video pictures, the method comprising:
a) encoding a plurality of video pictures as unidirectional motion compensated (P) video pictures;
b) determining a number of B-video pictures for the sequence of video pictures based on a cost value associated with the P-video pictures; and
c) encoding the sequence of video pictures using the determined number of B-video pictures.

36. The method of claim 35, wherein the sequence of video pictures that is encoded is the plurality of video pictures before being encoded as P-video pictures.

37. The method of claim 35, wherein encoding the plurality of video pictures as P-video pictures and determining the number of B-video pictures are performed in a first pass operation, wherein encoding the sequence of video pictures using the number of B-video pictures is performed in a second pass operation.

38. The method of claim 37, wherein the first pass operation is performed iteratively for more than one video picture.

39. The method of claim 35, wherein determining the number of B-video pictures comprises determining whether the cost value is greater than a threshold value, wherein when the cost value is greater than a threshold value, the number of B-video pictures is the number of video pictures between the particular video picture and a reference video picture.

40. The method of claim 35, wherein the cost value is based on motion vectors for at least two video pictures in the sequence of video pictures.

41. A method comprising:
a) determining a relationship between a motion vector cost value for a first video picture and a motion vector cost value for a second video picture; and
b) determining whether there is a scene cut between the first video picture and the second video picture based on the relationship.

42. The method of claim 41, wherein determining whether there is the scene cut comprises determining whether the relationship is less than a predetermined threshold value.

43. The method of claim 42, wherein the relationship is a ratio between the motion vector cost value for the first video picture and the motion vector cost value for the second video picture.

44. The method of claim 43 further comprising determining there is the scene cut when the ratio is not less than the predetermined threshold value.

45. The method of claim 44 further comprising marking a particular video picture as a video picture after the scene cut.

46. The method of claim 45, wherein marking the particular video picture comprises marking the particular video picture as an I-video picture.

47. A computer readable medium storing a computer program for processing a sequence of video pictures, the computer program executable by at least one processor, the computer program comprising sets of instructions for:
a) determining a number of bidirectional motion compensated (B) video pictures for the sequence of video pictures based on a cost value associated with motion vectors that are based only on a particular video picture and a preceding video picture; and
b) encoding the sequence of video pictures using the determined number of B-video pictures.

48. The computer readable medium of claim 47, wherein the set of instructions for determining the number of B-video pictures comprises sets of instructions for:
a) computing at least one motion vector for at least one video picture in the sequence of video pictures;
b) computing a cost value for at least one computed motion vector; and
c) determining whether the cost value is greater than a threshold value to determine the number of B-video pictures.

49. A computer readable medium storing a computer program for processing a sequence of video pictures, the computer program executable by at least one processor, the computer program comprising sets of instructions for:
a) encoding a plurality of video pictures as unidirectional motion compensated (P) video pictures;
b) determining a number of B-video pictures for the sequence of video pictures based on a cost value associated with the P-video pictures; and
c) encoding the sequence of video pictures using the determined number of B-video pictures.

50. The computer readable medium of claim 49, wherein the set of instructions for determining the number of B-video pictures comprises a set of instructions for determining whether the cost value is greater than a threshold value, wherein when the cost value is greater than a threshold value, the number of B-video pictures is the number of video pictures between the particular video picture and a reference video picture.

51. A computer readable medium storing a computer program that is executable by at least one processor, the computer program comprising sets of instructions for:
a) determining a relationship between a motion vector cost value for a first video picture and a motion vector cost value for a second video picture; and
b) determining whether there is a scene cut between the first video picture and the second video picture based on the relationship.

52. The computer readable medium of claim 51, wherein the set of instructions for determining whether there is the scene cut comprises a set of instructions for determining whether the relationship is less than a predetermined threshold value.

* * * * *

UNITED STATES PATENT AND TRADEMARK OFFICE
CERTIFICATE OF CORRECTION

| | |
|---|---|
| PATENT NO. | : 7,295,612 B2 |
| APPLICATION NO. | : 10/658938 |
| DATED | : November 13, 2007 |
| INVENTOR(S) | : Barin Geoffry Haskell et al. |

It is certified that error appears in the above-identified patent and that said Letters Patent is hereby corrected as shown below:

<u>Title Page</u>

<u>Item (75)</u> reads: "Inventors: Barin Geoffrey Haskell, Mountain View, CA (US); Adriana Dumitras, Sunnyvale, CA (US); Atul Puri Cupertino, CA (US)"

Should read -- Inventors: Barin Geoffry Haskell, Mountain View, CA (US); Adriana Dumitras, Sunnyvale, CA (US); Atul Puri, Cupertino, CA (US) --

<u>Column 20</u>
Line 52 (Claim 20) reads: "The computer readable medium of claim 12, wherein:"

Should read -- The computer readable medium of claim 18, wherein: --

Signed and Sealed this

Twenty-sixth Day of August, 2008

JON W. DUDAS
*Director of the United States Patent and Trademark Office*